US011201508B2

(12) United States Patent
Mynar et al.

(10) Patent No.: US 11,201,508 B2
(45) Date of Patent: Dec. 14, 2021

(54) POWER TRANSMITTER UNIT

(71) Applicant: NXP USA, INC., Austin, TX (US)

(72) Inventors: Zbynek Mynar, Roznov pod Radhostem (CZ); Jozef Cicka, Cadca (SK); Vojtěch Musil, Kuncice pod Ondrejnikem (CZ)

(73) Assignee: NXP USA, Inc., Austin, TX (US)

( * ) Notice: Subject to any disclaimer, the term of this patent is extended or adjusted under 35 U.S.C. 154(b) by 349 days.

(21) Appl. No.: 16/295,551

(22) Filed: Mar. 7, 2019

(65) Prior Publication Data

US 2019/0312467 A1  Oct. 10, 2019

(30) Foreign Application Priority Data

Apr. 9, 2018 (EP) .................................... 18166405

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .. H02J 5/005; H02J 7/025; H02J 50/12; H02J 50/60
USPC ........................................................ 307/104
See application file for complete search history.

(56) References Cited

U.S. PATENT DOCUMENTS

| | | |
|---|---|---|
| 6,591,682 B1 | 7/2003 | Lysen |
| 8,947,045 B2 | 2/2015 | Jung et al. |
| 9,423,439 B2 | 8/2016 | Jung et al. |
| 9,623,763 B2 | 4/2017 | Wechlin et al. |

(Continued)

FOREIGN PATENT DOCUMENTS

| | | |
|---|---|---|
| EP | 3293849 A1 | 3/2018 |
| WO | WO-2013/164831 A1 | 11/2013 |
| WO | 2016/159788 A1 | 10/2016 |

OTHER PUBLICATIONS

U.S. Appl. No. 16/273720, Notice of Allowance, dated Oct. 29, 2020, 18 pages.

(Continued)

*Primary Examiner* — Levi Gannon

(57) ABSTRACT

A power-transmitter-unit comprises a power-transmitting-coil and a resonant-capacitor that define an LC circuit. A controller defines a power-transmission-mode of operation and a foreign-object-detection-mode of operation. In the power-transmission-mode of operation: a power-stage provides a potential-difference across a first-end and a second-end of the LC circuit. In the foreign-object-detection-mode of operation: for a recuperation-time-interval, the power-stage provides a potential-difference across the first-end and the second-end of the LC circuit that has the opposite polarity to the current through the power-transmitting-coil; after expiry of the recuperation-time-interval, the first-end of the LC circuit is connected to the second-end of the LC circuit such that the LC circuit is short-circuited and defines a closed-LC-circuit; and the controller receives measured-signalling that is representative of an operating parameter of the power-transmitter-unit. The controller further processes the measured-signalling in order to provide an indication of whether or not a foreign object has been detected.

14 Claims, 6 Drawing Sheets

(56) References Cited

U.S. PATENT DOCUMENTS

| | | |
|---|---|---|
| 9,729,204 B2 | 8/2017 | Kozakai et al. |
| 9,825,486 B2 | 11/2017 | Liu et al. |
| 2009/0216472 A1 | 8/2009 | Zima et al. |
| 2012/0326521 A1 | 12/2012 | Bauer et al. |
| 2014/0225452 A1 | 8/2014 | Kozaki et al. |
| 2015/0028689 A1 | 1/2015 | Arisawa |
| 2015/0035558 A1 | 2/2015 | Tawaragi |
| 2015/0054355 A1 | 2/2015 | Ben-Shalom et al. |
| 2015/0115734 A1 | 4/2015 | Tawaragi |
| 2015/0280453 A1* | 10/2015 | Ikefuji .................. H02J 50/90 320/108 |
| 2015/0285926 A1 | 10/2015 | Oettinger |
| 2015/0311725 A1 | 10/2015 | Yamamoto et al. |
| 2015/0349543 A1* | 12/2015 | Sakata .................. H02J 5/005 307/104 |
| 2015/0355359 A1* | 12/2015 | Miyashita ............... G01V 3/10 324/207.16 |
| 2016/0099578 A1 | 4/2016 | Hwang |
| 2016/0139618 A1 | 5/2016 | Tsai et al. |
| 2016/0187519 A1 | 6/2016 | Widmer et al. |
| 2016/0285278 A1 | 9/2016 | Mehas et al. |
| 2016/0349782 A1 | 12/2016 | Tsai et al. |
| 2016/0372749 A1 | 12/2016 | Lida et al. |
| 2017/0004686 A1 | 1/2017 | Zacchio et al. |
| 2017/0033615 A1* | 2/2017 | Asanuma ............... H02J 5/005 |
| 2017/0085135 A1 | 3/2017 | Stevens et al. |
| 2017/0117755 A1 | 4/2017 | Muratov et al. |
| 2018/0026482 A1 | 1/2018 | Asano et al. |
| 2018/0198323 A1* | 7/2018 | Widmer ................ G01V 11/00 |
| 2018/0212476 A1 | 7/2018 | Nguyen et al. |
| 2018/0219430 A1 | 8/2018 | Russell et al. |
| 2019/0074722 A1 | 3/2019 | Shahsavari et al. |
| 2019/0272943 A1 | 9/2019 | Leem |
| 2019/0310388 A1 | 10/2019 | Park et al. |
| 2019/0326782 A1 | 10/2019 | Graham et al. |

OTHER PUBLICATIONS

Office action, Non-Final Rejection, U.S. Appl. No. 16/73720, dated May 29, 2020 23 pages.

* cited by examiner

POWER TRANSMITTER UNIT

CROSS-REFERENCE TO RELATED APPLICATIONS

This application claims the priority under 35 U.S.C. § 119 of European Patent application no. 18166405.3, filed on 9 Apr. 2018, the contents of which are incorporated by reference herein.

The present disclosure relates to power transmitter units, and in particular to power transmitter units that wirelessly provide power to a power receiver unit.

According to a first aspect of the present disclosure there is provided a power-transmitter-unit comprising:
- a power-transmitting-coil for wirelessly providing power to a power-receiver-unit, and a resonant-capacitor connected to the power-transmitting-coil, such that together they define an LC circuit, wherein the LC circuit comprises a first-end and a second-end;
- a power-stage for selectively providing power to the LC circuit;
- a controller configured to define a power-transmission-mode of operation and a foreign-object-detection-mode of operation, wherein:
  - in the power-transmission-mode of operation:
    - the power-stage is configured to provide a potential-difference across the first-end and the second-end of the LC circuit;
  - in the foreign-object-detection-mode of operation:
    - for a recuperation-time-interval, the power-stage is configured to provide a potential-difference across the first-end and the second-end of the LC circuit that has the opposite polarity to the current through the power-transmitting-coil;
    - after expiry of the recuperation-time-interval, the first-end of the LC circuit is connected to the second-end of the LC circuit such that the LC circuit is short-circuited and defines a closed-LC-circuit; and
    - the controller is configured to receive measured-signalling that is representative of an operating parameter of the power-transmitter-unit;
- wherein the controller is further configured to:
  - process the measured-signalling in order to provide an indication of whether or not a foreign object has been detected.

Advantageously, this functionality can reduce the duration of the foreign-object-detection-mode, and therefore a smaller capacitance for a DC-bus capacitor in an associated power-receiver-unit can be used.

In one or more embodiments, in the power-transmission-mode of operation: the power-stage is configured to alternately provide a first-potential-difference and a second-potential-difference across the first-end and the second-end of the LC circuit in order to generate current through the power-transmitting-coil.

In one or more embodiments, in the foreign-object-detection-mode of operation:
- for the recuperation-time-interval, the power-stage is configured to provide the opposite one of the first-potential-difference and the second-potential-difference across the first-end and the second-end of the power-transmitting-coil to the potential-difference that would cause resonance of the current through the power-transmitting-coil.

In one or more embodiments, the controller is configured to set the recuperation-time-interval based on operational-signalling that is representative of an operating parameter of the power-transmitter-unit obtained during a preceding power-transmission-mode of operation.

In one or more embodiments, the measured-signalling is representative of an operating parameter of the power-transmitter-unit after expiry of the recuperation-time-interval.

In one or more embodiments, the measured-signalling is representative of an operating parameter of the closed-LC-circuit.

In one or more embodiments, the measured-signalling comprises a coil-current-signal that is representative of the current through the closed-LC-circuit. The controller may be configured to: process the coil-current-signal that was received during the foreign-object-detection-mode of operation, in order to determine the resistance of the closed-LC-circuit; and optionally provide an indication that a foreign object has been detected if the determined resistance of the closed-LC-circuit is greater than a resistance-threshold value.

In one or more embodiments, the power-transmitter-unit further comprises an ADC configured to provide the measured-signalling as a sequence of digital samples that are representative of an operating parameter of the closed-LC-circuit.

In one or more embodiments, the controller is configured to apply an auto-regressive modelling algorithm to the measured-signalling in order to provide an indication of whether or not a foreign object has been detected.

In one or more embodiments, the controller is configured to apply a least squares method to the measured-signalling in order to provide an indication of whether or not a foreign object has been detected.

In one or more embodiments, the controller is configured to disable the power-transmission-mode of operation if the controller provides an indication that a foreign object has been detected.

In one or more embodiments, the power-transmitter-unit comprises a plurality of power-transmitting-coils for wirelessly providing power to a power-receiver-unit. Each power-transmitting-coil may be connected to a resonant-capacitor to define an LC circuit, and wherein each LC circuit may comprise a first-end and a second-end. In the power-transmission-mode of operation: the power-stage may be configured to provide a potential difference across the respective first-ends and second-end of the plurality of LC circuits. In the foreign-object-detection-mode of operation, for each of the plurality of LC circuits in turn: for a recuperation-time-interval, the power-stage may be configured to provide a potential-difference across the first-end and the second-end of the LC circuit that has the opposite polarity to the current through the power-transmitting-coil; after expiry of the recuperation-time-interval, the first-end of the LC circuit may be connected to the second-end of the LC circuit such that the LC circuit is short-circuited and defines a closed-LC-circuit; and the controller may be configured to receive measured-signalling that is representative of an operating parameter of the power-transmitter-unit. The controller may be further configured to process the measured-signalling in order to provide an indication of whether or not a foreign object has been detected.

According to a further aspect, there is provided a method of detecting a foreign object, the method comprising:
in a power-transmission-mode of operation:

providing a potential-difference across a first-end and a second-end of an LC circuit, wherein the LC circuit comprises a resonant-capacitor connected to a power-transmitting-coil;

in a foreign-object-detection-mode of operation:
for a recuperation-time-interval, providing a potential-difference across the first-end and the second-end of the LC circuit that has the opposite polarity to the current through the power-transmitting-coil;
after expiry of the recuperation-time-interval, connecting the first-end of the LC circuit to the second-end of the LC circuit such that the LC circuit is short-circuited and defines a closed-LC-circuit; and
receiving measured-signalling that is representative of an operating parameter of the power-transmitter-unit;

processing the measured-signalling in order to provide an indication of whether or not a foreign object has been detected.

There may be provided an electronic device comprising any power-transmitter-unit, apparatus, controller or system disclosed herein, or configured to perform any method disclosed herein.

There may be provided a computer program configured to perform any method disclosed herein, or configured to provide the functionality of any power-transmitter-unit, apparatus, controller or system disclosed herein.

The ADC may be configured to provide one or more digital samples for each period of the current through the closed-LC-circuit. The ADC may be configured to apply a sampling rate that satisfies the Nyquist sampling rate for the power-transmitter-unit. The ADC may be configured to provide digital samples that have a constant time period.

The ADC may provide the coil-current-signal as a sequence of digital samples that are representative of the current through the closed-LC-circuit. The ADC may be configured to provide one or more digital samples for each period of the current through the closed-LC-circuit.

The controller may be configured to apply an auto-regressive modelling algorithm to the coil-current-signal in order to determine the resistance of the closed-LC-circuit. The controller may be configured to apply a least squares method to the coil-current-signal in order to determine the resistance of the closed-LC-circuit.

The controller may be configured to disable the power-transmission-mode of operation if the determined resistance of the closed-LC-circuit is greater than a resistance-threshold value.

The controller may be configured to periodically switch between the power-transmission-mode of operation and the foreign-object-detection-mode of operation.

A single capacitor may provide the functionality of the resonant-capacitor of a plurality, and optionally all, of the LC circuits.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Wireless charging systems can include a power transmitter unit (PTU) and a power receiver unit (PRU). Such systems use an electromagnetic field to transfer energy from a power transmitter coil to a power receiver coil. If there are electrically conductive (foreign) objects in the electromagnetic field between the PTU and PRU coils, then eddy currents are induced in those objects. This can cause excessive heating of the object, and can cause damage to health or property.

One or more of the examples disclosed below can detect electrically conductive foreign objects (FO) that are located in the vicinity of the PTU and PRU during power transfer. Optionally, power transfer can be terminated in response to the detection of a foreign object in order to improve the safety of the system.

Figure 1:
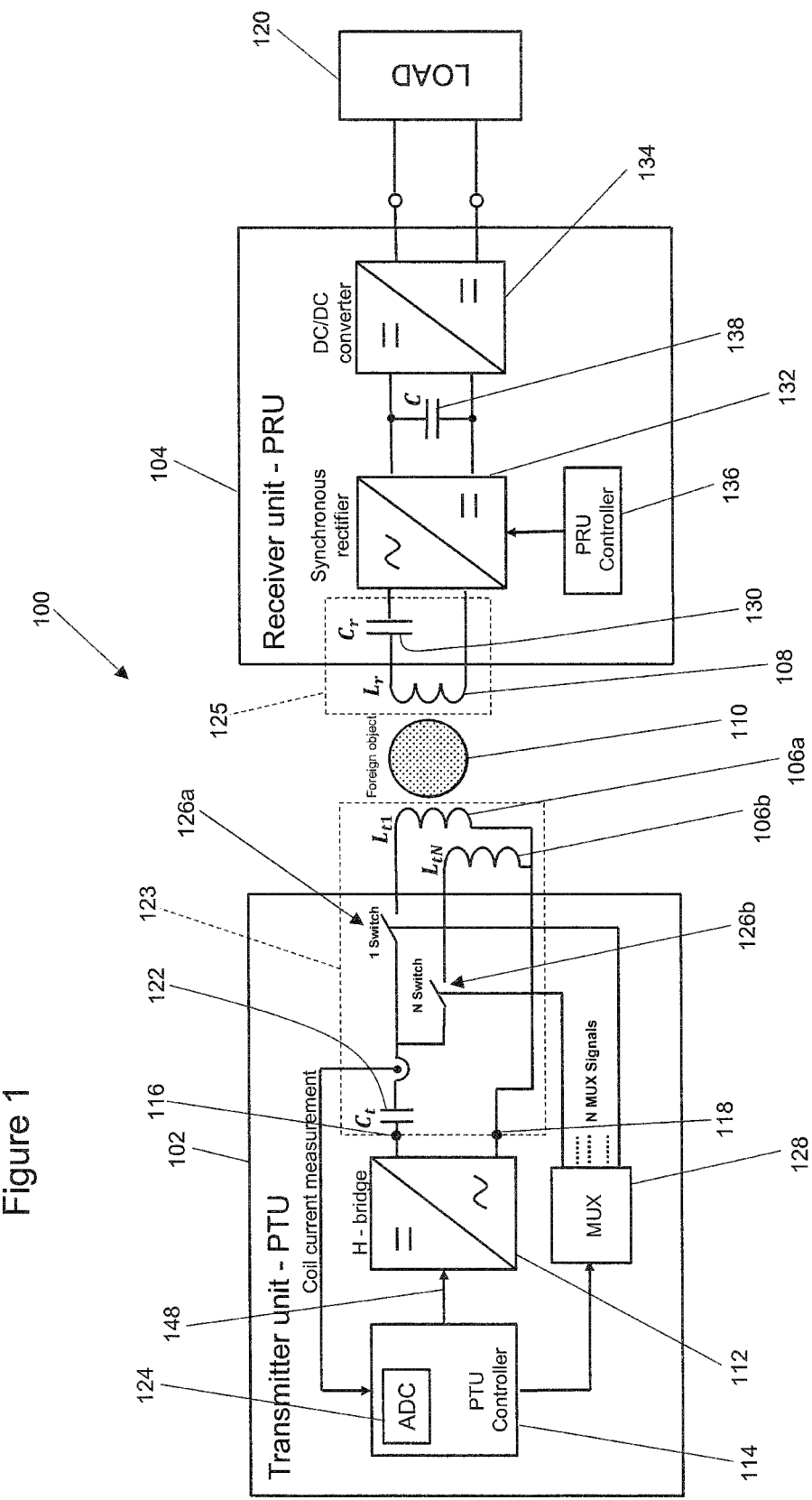
FIG. 1 shows a simplified block diagram of a wireless charging system.

FIG. 1 shows a simplified block diagram of a wireless charging system 100. The wireless charging system 100 includes a power-transmitter-unit 102 and a power-receiver-unit 104.

The power-transmitter-unit 102 includes at least one power-transmitting-coil Lt 106 for wirelessly providing power to the power-receiver-unit 104. In FIG. 1, the power-transmitter-unit 102 includes a plurality of power-transmitting-coils 106a, 106b, and is a multi-coil system. The immediately following description relates to use of a single power-transmitting-coil 106. Additional description is provided later in this document for a system with a plurality of power-transmitting-coils 106.

The power-receiver-unit 104 has a power-receiving-coil 108 for receiving power from the power-transmitting-coil 106.

The power-transmitter-unit 102 also includes a power-stage 112 for selectively providing power to the power-transmitting-coil 106. In this example the power-stage 112 is provided as an H-bridge inverter, which provides appropriate voltages across the power-transmitting-coil 106 such that it generates a high-frequency power electromagnetic field. Further details of the power-stage 112 are provided below with reference to FIG. 2.

A controller 114 is associated with the power-transmitter-unit 102, and can control the wireless power transfer process including its initiation.

A resonant-capacitor Ct 122 is connected in series with the power-transmitting-coil 106, such that together they define an LC circuit 123. (In other examples, not shown, the LC circuit may include additional components, and the resonant-capacitor Ct 122 can be connected in parallel with the power-transmitting-coil 106.) The power-stage 112 can alternately provide a first-potential-difference and a second-potential-difference across a first-end 116 and a second-end 118 of the LC circuit 123 in order to generate current through the power-transmitting-coil 106. During power transfer, in one example the first-potential-difference can be the opposite polarity to the second-potential-difference. In some examples, phase shift control can be used such that first-potential-difference can be out of phase with respect to the second-potential-difference by any amount.

The power-receiver-unit 104 includes a resonant-capacitor Cr 130 that is in series with the power-receiving-coil 108. In this way, the resonant-capacitor Cr 130 and the power-receiving-coil 108 define an LC resonant circuit 125 in the power-receiver-unit 104, in a similar way to the LC circuit 123 in the power-transmitter-unit 102. The power-receiver-unit 104 in this example also includes a synchronous rectifier 132 that rectifies the AC voltage that is provided by the power-receiving-coil 108, and a DC/DC converter 134 that converts the rectified voltage provided by the synchronous rectifier 132 into a suitable voltage for its load 120.

The power-receiver-unit 104 further includes a receiver-controller 136 for controlling the synchronous rectifier 132, and a DC-bus-capacitor C 138 connected between the input terminals of the DC/DC converter 134. The DC-bus-capacitor C 138 is used to store charge that is provided by the synchronous rectifier 132. In this way, the voltage at the input terminals of the DC/DC converter 134 can be maintained at a sufficiently high level if there is a temporary interruption to the voltage induced in the power-receiving-coil 108.

Also shown in FIG. 1 is a foreign object 110, which is in the vicinity of the power-transmitting-coil 106. As discussed above, this can lead to the undesired heating of the foreign object 110.

The controller 114 is configured to define a power-transmission-mode of operation and a foreign-object-detection-mode of operation of the power-transmitter-unit 102. In this example, the controller 114 provides control-signalling 148 to the power-stage 112 to set the mode of operation.

In the power-transmission-mode of operation, the power-stage 112 is configured to provide a potential difference across the first-end 116 and the second-end 118 of the LC circuit 123—for example to alternately provide a first-potential-difference and a second-potential-difference, as described above. This can be considered as normal power transfer, and can result in the power-transmitter-unit 102 wirelessly providing power to the power-receiver-unit 104. In turn, the power-receiver-unit 104 can provide power to its load 120. For instance, the power-receiver-unit 104 can be part of a notebook computer, and the load 120 can be the notebooks power management system. In this way, the power-transmitter-unit 102 can be used to wirelessly charge the battery of the notebook.

In the foreign-object-detection-mode of operation, the power-transmitter-unit 102 can determine whether or not a foreign object 110 is receiving power from a power-transmitting-coil 106, and therefore whether or not a conductive foreign object 110 is in the vicinity of a power-transmitting-coil 106. Further details of the foreign-object-detection-mode of operation will be provided below.

When the controller 114 puts the power-transmitter-unit 102 into the foreign-object-detection-mode of operation, for at least a portion of the time it connects the first-end 116 of the LC circuit 123 formed by the power-transmitting-coil 106 and the resonant-capacitor Ct 122 to the second-end 118 of the LC circuit 123 such that the LC circuit 123 is short-circuited. This can be referred to as a closed-LC-circuit. That is, the first-end 116 and the second-end 118 246b of the power-transmitting LC circuit 123 can be put at the same potential. In this example, as will described with reference to FIG. 2, the power-stage 112 includes one or more switches that are operable to selectively short circuit the power-transmitting LC circuit 123. In other examples, the functionality to short-circuit the power-transmitting LC circuit 123 may be provided by a separate component.

Figure 2A:
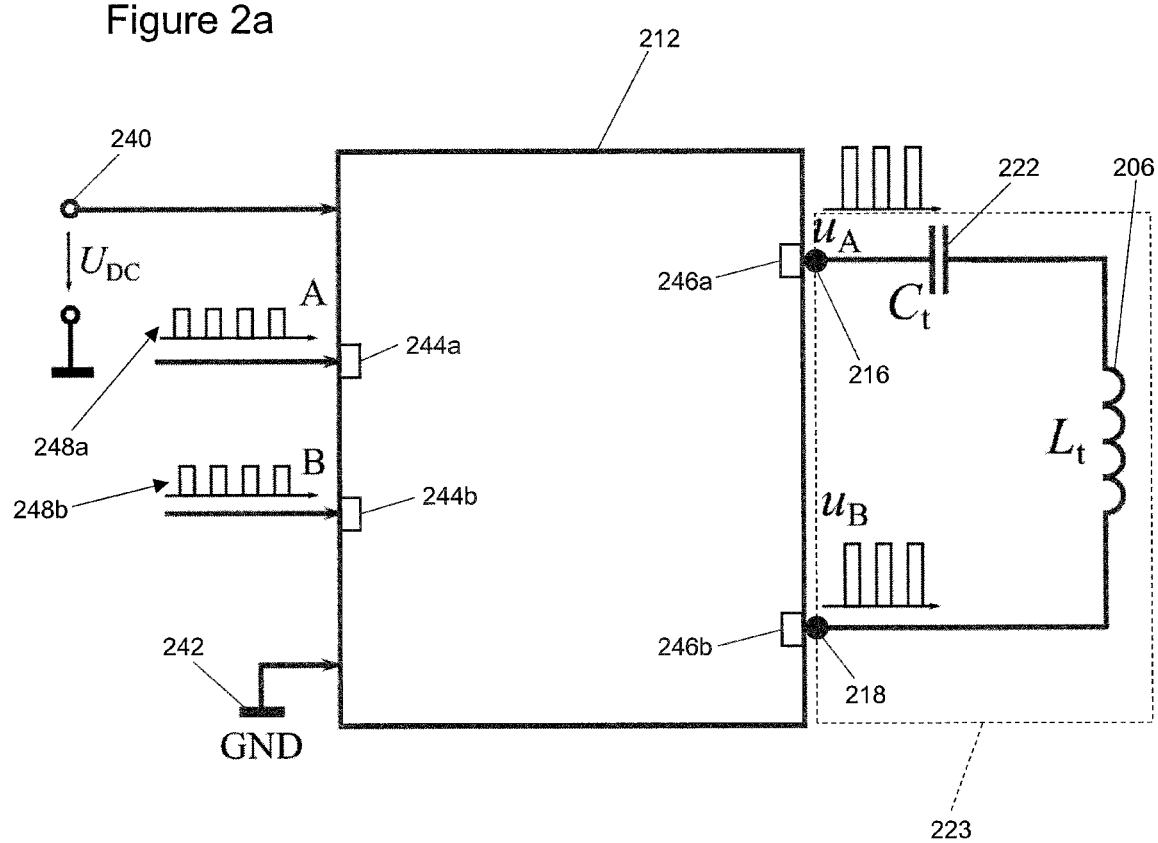
FIGS. 2a and 2b show an example implementation of the power-stage of FIG. 1.
Figure 2B:
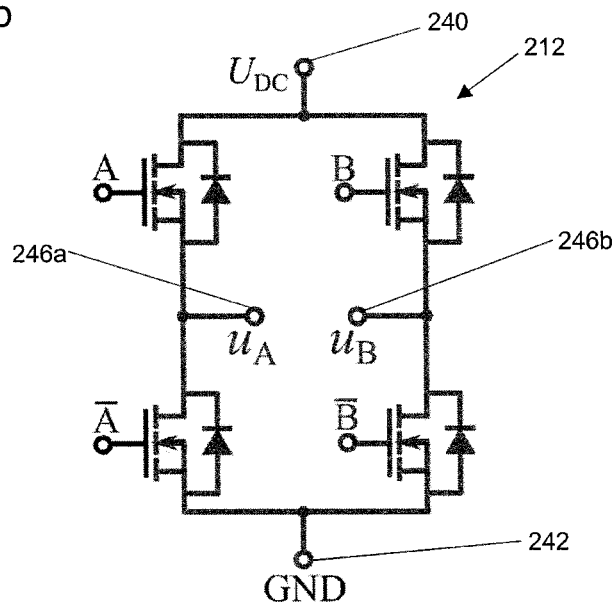

FIGS. 2a and 2b show an example implementation of the power-stage of FIG. 1.

FIG. 2a shows a block diagram of the power-stage 212. The power-stage 212 receives a rail-voltage $U_{DC}$ 240. The power-stage 212 is also connected to a reference-terminal, which in this example is ground 242. The power-stage 212 has a first- and a second-output-terminal ($u_A$, $u_B$) 246a, 246b, which are respectively coupled to the first-end 216 of the LC circuit 223 and the second-end 218 of the LC circuit 223. As discussed with reference to FIG. 1, the LC circuit 223 includes the power-transmitting-coil 206 and the resonant-capacitor Ct 222.

In this example, the power-stage 212 has a first- and a second-input-terminal 244a, 244b, which respectively receive a first- and a second-control-signal (A, B) 248a, 248b from the controller (not shown).

FIG. 2b shows an implementation of the block diagram of FIG. 2a, which in this example is an H-bridge.

During the power-transmission-mode of operation, the control-signals 248 at each of the first- and second-input-terminals 246a, 246b are square waves that alternate between a high-value and zero. Depending on whether phase-shift control or rail voltage $U_{DC}$ control is used, the control-signals 248 can have opposite values to one another. That is, when one of the signals 248 received at an input-terminal 246 is high, the signal 248 received at the other input-terminal 246 is zero, and vice versa. As will be appreciated from FIG. 2b, this generates voltage signals at each of the first- and second-output-terminals ($u_A$, $u_B$) 246a, 246b that are square waves that alternate between: (i) a voltage level that corresponds to the rail-voltage $U_{DC}$ 240; and (ii) ground 242. In this way, the power-stage 212 alternately provides a first-potential-difference and a second-potential-difference across the first-end 216 and the second-end 218 of the power-transmitting LC circuit 223 in order to generate a current through the power-transmitting-coil Lt 206.

Advantageously, when the power-transmitter-unit is in the foreign-object-detection-mode of operation, the power-stage 212 of FIG. 2 can also be used to short-circuit the power-transmitting LC circuit 223. During the foreign-object-detection-mode of operation, the controller (not shown) provides control-signals 248 at each of the first- and second-input-terminals 246a, 246b of the power-stage 212 that have the same value—that is, the control-signals 248 received at both input-terminals 246a, 246b are either both high or are both zero. As will be appreciated from FIG. 2b, this short-circuits the power-transmitting LC circuit 223 because both ends of the power-transmitting LC circuit 223 are either connected to the rail-voltage $U_{DC}$ 240, or to ground 242.

Figure 3A:
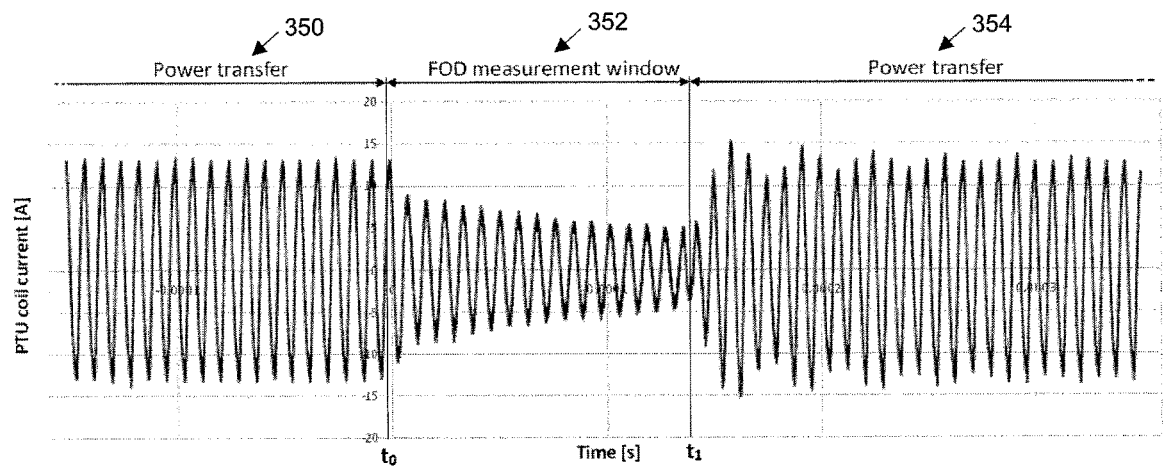
FIGS. 3a, 3b and 3c show plots of signals in the system of FIG. 1.
Figure 3B:
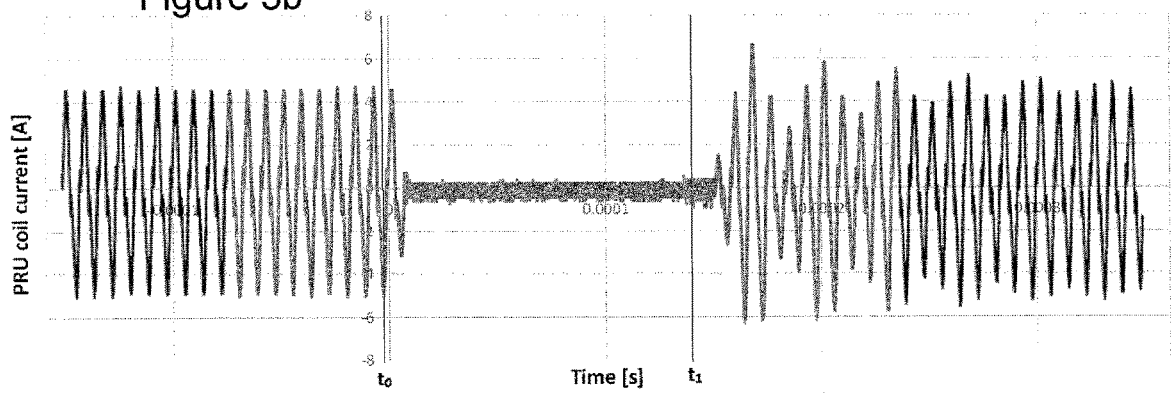
Figure 3C:
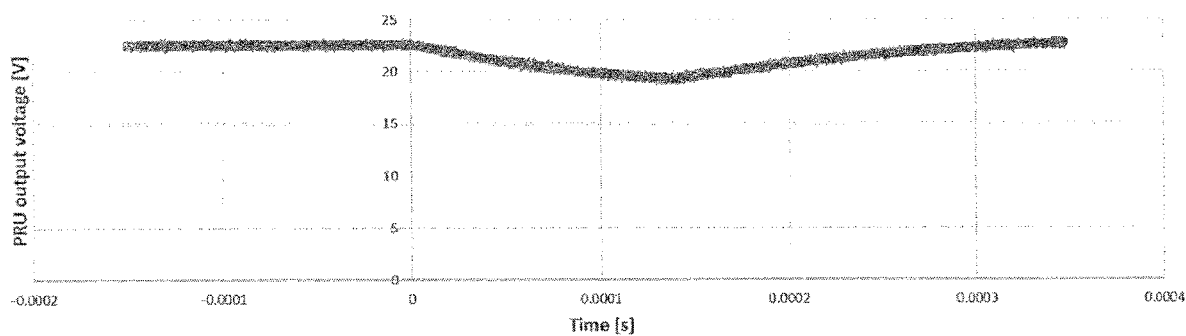

FIGS. 3a, 3b and 3c show plots of signals in the system of FIG. 1 for three time intervals:
   a first power-transmission-mode of operation 350,
   a foreign-object-detection-mode of operation 352; and
   a second power-transmission-mode of operation 354.

FIG. 3a shows the current through the power-transmitting-coil. FIG. 3b shows the current through the power-receiving-coil. FIG. 3c shows the voltage across the DC-bus-capacitor C 138 (that is, the voltage at the input of the DC/DC converter).

As can be seen from FIG. 3c, during the first power-transmission-mode of operation 350, the controller provides control-signals to the power-stage such that it maintains the voltage across the DC-bus-capacitor at a substantially constant value. (Information can be transferred from the power-receiver-unit back to the power-transmitter-unit, in any known way, to provide a control loop that maintains the voltage across the DC-bus-capacitor at the desired value.)

The foreign-object-detection-mode of operation 352 comprises a measurement window $<t_0, t_1>$. As discussed above, the measurement window can be relatively short, for example $t_1-t_0 \leq 100$ µs, and the measurement window $<t_0, t_1>$ may be inserted only a few times per second.

The foreign-object-detection-mode of operation 352 shown in FIG. 3 starts at the time $t_0$, at which point the controller short-circuits the power-transmitting-coil. That is, for the plots of FIG. 3, the power-transmitting LC circuit is short-circuited immediately at the start of the foreign-object-detection-mode of operation 352. For the example of FIG. 2, the power-transmitting LC circuit is short-circuited by turning on both of the top MOSFETs of the H-bridge (thus shorting the transmitter resonant circuit to the supply-voltage), or by turning on both of the bottom MOSFETs of the H-bridge (thus shorting the transmitter resonant circuit to ground).

During the foreign-object-detection-mode of operation 352, the controller of the power-transmitter-unit receives a signal representative of the current through the power-transmitting-coil (shown in FIG. 3a) such that it can determine whether or not a foreign object has been detected.

Once sufficient data about the current through the power-transmitting-coil has been provided to the controller, the second power-transmission-mode of operation 354 starts at the time $t_1$ and power transfer is restored. The duration of the foreign-object-detection-mode of operation 352 ($<t_0, t_1>$ as it is shown in FIG. 3) can have a fixed, predetermined value, or can be dynamically set by the controller. (As discussed below, the sampling period Ts applied by the ADC can be constant.) In some examples, the duration of the foreign-object-detection-mode of operation 352 can be set based on an operating parameter of the wireless charging system; in particular of the power-transmitter-unit. In one example, the duration of the foreign-object-detection-mode of operation 352 can be extended by the controller in order to increase the precision with which a foreign object cam be detected. For instance, if a previous foreign-object-detection-mode of operation 352 detects that a foreign object is present, then the controller can perform a further foreign-object-detection-mode of operation 352, with a longer duration, in order to confirm the earlier detection. As another example, the controller can set the duration of the foreign-object-detection-mode of operation 352 based on the level of power that is to be delivered to the load—when the load draws a smaller power, the controller can apply a longer foreign-object-detection-mode of operation 352 without interrupting the supply to the load.

During the second power-transmission-mode of operation 354, the DC-bus-capacitor is charged back to its original value as shown in FIG. 3c. To reduce the likelihood of any significant transients, the power provided to the power-transmitting-coil can be ramped-up over time (such as, over tens of microseconds) in some examples.

A benefit of this method is its independence of the power-receiver-unit. As shown in FIG. 3b, the receiver coil current drops to zero during the foreign-object-detection-mode of operation 352 and the power-receiver-unit therefore represents no significant losses from the point of view of the current through the power-transmitting-coil (as shown in FIG. 3a). Because of this, the parameters of the resonant LC circuit at the power-transmitter-unit (especially the resistance in the example described below) are not significantly distorted by the power-receiver-unit.

In order for the power-receiver-unit to be able to provide a reliable voltage to its load, the DC-bus capacitor (shown in FIG. 1 with reference 138) should maintain a voltage that is higher than a minimum acceptable DC/DC converter 134 input voltage during the foreign-object-detection-mode of operation 352. To provide this functionality, the size of the capacitance C of the DC-bus capacitor can be selected based on the maximal load power consumption.

Figure 4:
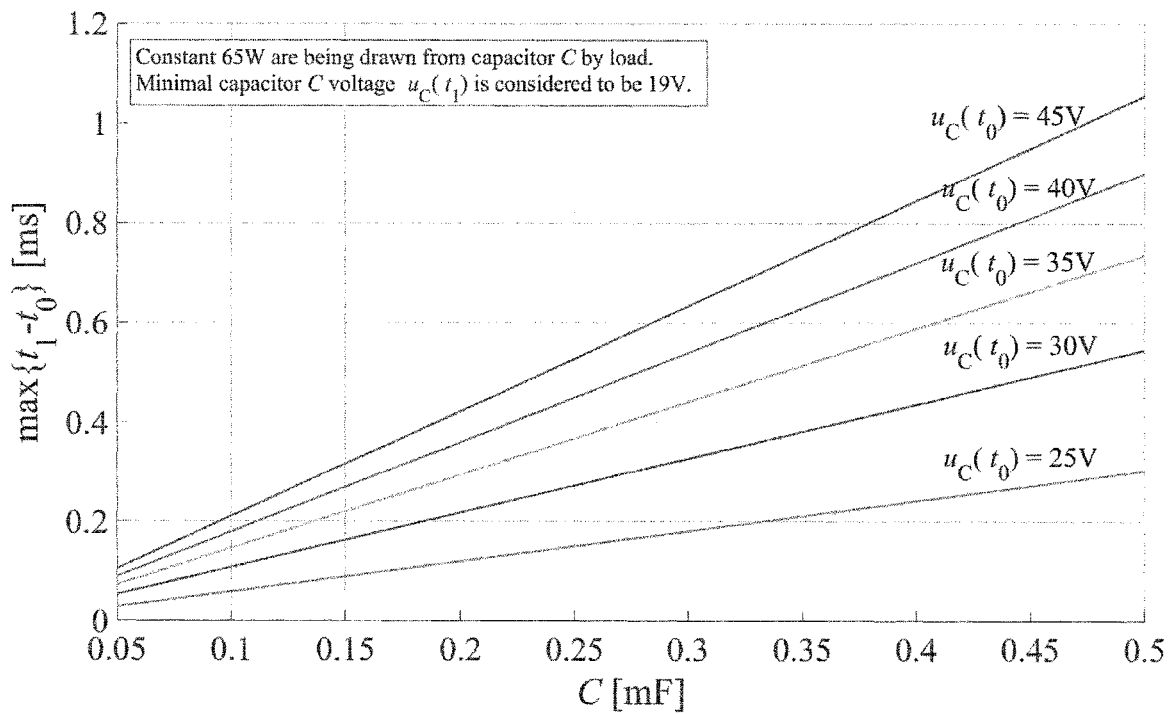
FIG. 4 shows a plot of: (i) capacitance of the DC-bus capacitor, on the horizontal axis, versus (ii) a maximum duration of the foreign-object-detection-mode of operation.

FIG. 4 shows a plot of: (i) a minimum size of the capacitance of the DC-bus capacitor that can be used, on the horizontal axis, versus (ii) a maximum duration of the foreign-object-detection-mode of operation (measurement window) that can be accommodated without the voltage supplied to the load being affected, on the vertical axis. Five different plots are shown for different initial voltage values across the DC-bus capacitor $U_C(t_0)$. Displayed information is based on a system having a load that draws 65 W at 19V.

As can be seen from FIG. 4, the required capacitance C increases with the maximum duration of the foreign-object-detection-mode of operation and decreases with initial capacitor C voltage $U_C(t_0)$. The required capacitance C also increases with maximal power drawn by load.

Returning to FIG. 3, as shown in FIG. 3b the current through the power-receiving-coil is an alternating current that does not immediately reduce to zero at the start of the foreign-object-detection-mode of operation 352. In FIG. 3b, there is a delay of about one period of the alternating current until the current through the power-receiving-coil drops to zero. The corresponding amplitude of the first period of the current through the power-transmitting-coil (as shown in FIG. 3a) will be influenced by this power transfer to the power-receiving-coil during the foreign-object-detection-mode of operation 352. Therefore, the first period of the current through the power-transmitting-coil will not be usable for accurately detecting a foreign objection using the process described below.

One option to address this issue is to discard the first period of the current through the power-transmitting-coil from the processing that is subsequently performed by the controller to detect a foreign object. However, in some applications this approach may not be acceptable because it will result in a longer period of time that is required to detect whether or not a foreign object is present.

An alternative approach is to reduce the current through the power-transmitting-coil more quickly at the start of the foreign-object-detection-mode of operation 352, thereby more quickly reducing the current that is induced into the power-receiving-coil. Described below is an advantageous method of reducing the current through the power-transmitting-coil that uses a recuperation principle, and does not require additional hardware or result in significant power losses. Furthermore, the method described below can reduce the duration of the foreign-object-detection-mode, and therefore a smaller capacitance for the DC-bus capacitor (reference 138 in FIG. 1) in the power-receiver-unit can be used.

Figure 8:
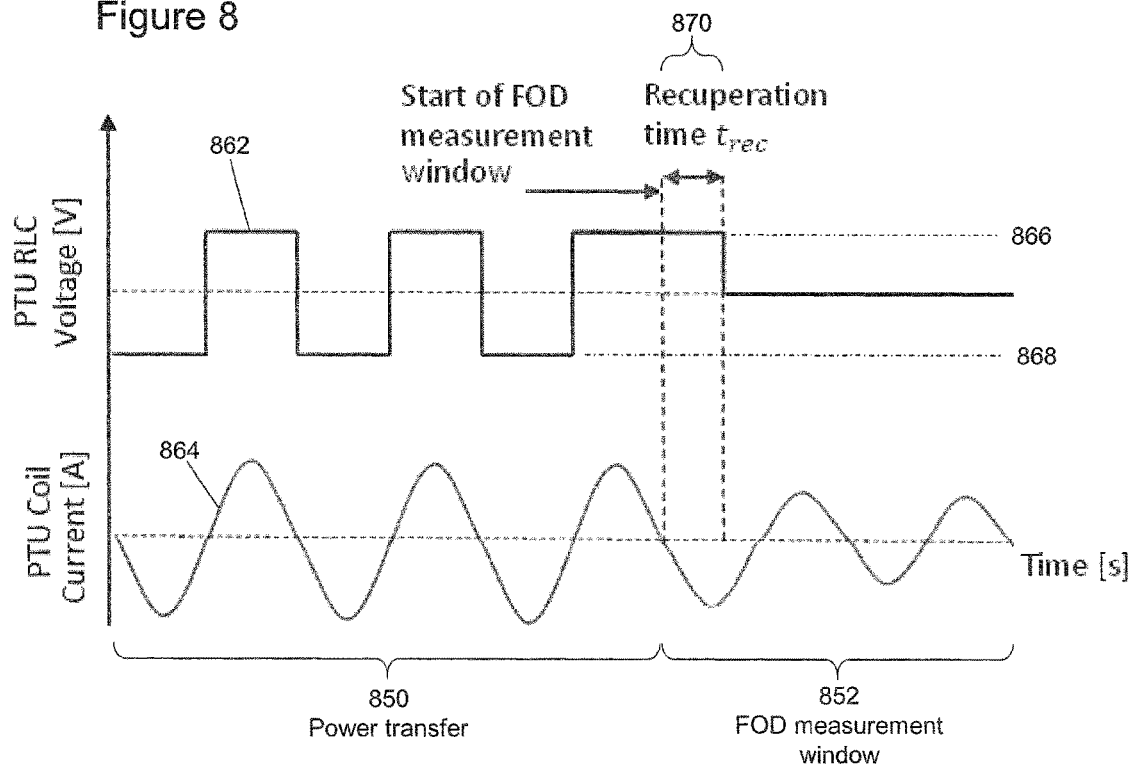
FIG. 8 shows plots of two signals over time for a first power-transmission-mode of operation and a foreign-object-detection-mode of operation.

FIG. 8 shows plots of two signals over time:
the upper plot 862 shows an example of the potential difference that is applied across the power-transmitting LC circuit by the power-stage; and
the lower plot 864 shows the current through the power-transmitting-coil.

FIG. 8 show plots of the signals in the system of FIG. 1 for a first power-transmission-mode of operation 850, and a foreign-object-detection-mode of operation 852.

During the first power-transmission-mode of operation 850, the power-stage alternately provides a first-potential-difference 866 and a second-potential-difference 868 across the first-end and the second-end of the power-transmitting LC circuit (as shown in the upper plot in FIG. 8). As shown in the lower plot of FIG. 8, this causes resonance of the current 864 through the power-transmitting-coil. In this example, the first-potential-difference 866 is of the opposite polarity to the second-potential-difference 868, and the current 864 through the power-transmitting-coil is an alternating current that has either a positive or negative value. In the first power-transmission-mode of operation 850: when the potential-difference across the power-transmitting LC circuit is positive, the current 864 through the power-transmitting-coil is also positive. Similarly, when the potential-difference across the power-transmitting LC circuit is negative, the current 864 through the power-transmitting-coil is also negative.

As indicated above, in other examples phase shift control can be used, in which case the potential difference that is applied across the power-transmitting LC circuit by the power-stage would be different to that shown in the upper plot of FIG. 8. For example, there could be times when the potential difference would be equal to zero. Also, it can be noted that FIG. 8 shows operation at a resonance frequency of the LC circuit at the power-transmitter-unit, because the LC voltage 862 and coil currents 864 are in phase (the RLC circuit can act as a pure resistive load)

FIG. 8 shows that the foreign-object-detection-mode of operation 852 includes a recuperation-time-interval $t_{rec}$ 870, which in this example is immediately at the start of foreign-object-detection-mode of operation 852. In other examples, there may be a slight delay before the controller provides the recuperation-time-interval $t_{rec}$ 870, for example to wait for a predetermined phase of the current 864 through the power-transmitting-coil, such as a zero-crossing. During the recuperation-time-interval $t_{rec}$ 870, the power-stage is configured to provide a potential-difference that has the opposite polarity to the current 864 through the power-transmitting-coil. That is, when the current 864 through the power-transmitting-coil is positive, the potential-difference across the power-transmitting LC circuit is negative, and vice versa.

In this way, the power-stage can apply the opposite one of the first-potential-difference or the second-potential-difference across the first-end and the second-end of the power-transmitting LC circuit to the potential-difference that would cause resonance of the current through the power-transmitting-coil. Therefore, the potential-difference applied across the power-transmitting LC circuit during the recuperation-time-interval $t_{rec}$ 870 suppresses the resonance of the current through the power-receiving-coil such that it more quickly reduces to zero.

As shown in FIG. 8, at the end of the first power-transmission-mode of operation 850, the potential difference applied across the power-transmitting LC circuit is the first-potential-difference 866 (a positive value in this example). If the power-transmitter-unit were to continue in the first power-transmission-mode of operation 850, then the potential difference applied across the power-transmitting LC circuit would change to the second-potential-difference 868 (a negative value in this example) at that instant in time. However, instead the controller sets the potential difference across the power-transmitting LC circuit to the first-potential-difference 866 in order to define the start of the recuperation-time-interval $t_{rec}$ 870. This causes power to flow from the LC resonant circuit (that includes the power-transmitting-coil) of the power-transmitter-unit into the rail-voltage bus ($u_{DC}$). As shown in the lower plot of FIG. 8, this results in the current 864 through the power-transmitting-coil reducing. This reduction is quicker than would be the case if the power-transmitting LC circuit were short-circuited immediately at the start of the foreign-object-detection-mode of operation 852.

After expiry of the recuperation-time-interval $t_{rec}$ 870, the first-end of the power-transmitting LC circuit is connected to the second-end of the power-transmitting LC circuit such that the LC circuit is short-circuited and defines a closed-LC-circuit. At this point, the potential difference across the power-transmitting LC circuit 862 is set to zero.

In this example, the controller sets the duration of the recuperation-time-interval $t_{rec}$ 870 based on operational-signalling that is representative of an operating parameter of the power-transmitter-unit, optionally signalling obtained during a preceding power-transmission-mode of operation. The operational-signalling can comprise one or more of: the amplitude of the current 864 through the power-transmitting-coil during the preceding power-transmission-mode of operation 850; the mark-space ratio of the potential difference across the power-transmitting LC circuit 862; the duration that the potential difference across the power-transmitting LC circuit 862 is at the first-potential-difference 866 or the second-potential-difference 868; the voltage level of the first-potential-difference 866 or the second-potential-difference 868; the voltage across the resonant-capacitor of the power-transmitting LC circuit, or any other operating parameter of the power-transmitter-unit. In further examples still, the controller can set the duration of the recuperation-time-interval $t_{rec}$ 870 as a predetermined value.

In some applications, the amplitude of the LC voltage 862 may remain constant (and can be independent of the required level of power transfer). The controller can set the duration of the recuperation-time-interval $t_{rec}$ 870 in order to control the recuperation. In one example, the following linear function can be used:

$$t_{rec} = f(U_{DC}, I_{coil})$$

where $U_{DC}$ is the rail-voltage of the power-transmitter-unit, and $I_{coil}$ is amplitude of the current through the power-transmitting-coil (or an RMS value of the current) measured during a power transfer operation. It may not be important for the recuperation-time-interval $t_{rec}$ 870 to reduce the coil current 864 to a defined amplitude level; instead it can be more important to reduce the current through the power-transmitting-coil sufficiently quickly such that the voltage induced to the power-receiving-coil is smaller than the DC bus-voltage level of the power-receiver-unit (such that current stops flowing through the power-receiving-coil).

The recuperation-time-interval $t_{rec}$ 870 can be considered as an interval of time during which the LC voltage 862 has the same frequency but opposite polarity to the LC voltage 862 that is applied during a power-transmission-mode of operation 850. The "recuperation" that is provided during the recuperation-time-interval $t_{rec}$ 870 can then simply be implemented by inverting the phase of LC voltage 862 by 180 degrees at the start of the recuperation-time-interval $t_{rec}$ 870. It will be appreciated that the duration of the recuperation-time-interval $t_{rec}$ 870 is not linked to the frequency of the current 864 through the power-transmitting-coil: it could be shorter than, equal to, or longer than half a period of the coil current 864 period. Also, the start of the recuperation-time-interval $t_{rec}$ 870 does not need to be aligned with a specific phase of the coil current 864.

The controller is configured to receive measured-signalling, which is representative of any operating parameter of the wireless charging system, and in particular of the LC circuit of the power-transmitter-unit, while the power-transmitter-unit is in the foreign-object-detection-mode of operation 852. In some examples, the recuperation-time-interval $t_{rec}$ 870 can be sufficiently short such that the measured-signalling representative of the entire measurement window can be processed by the controller to detect a foreign object. In other examples, the controller may only process the measured-signalling that is representative of a period of time that is after expiry of the recuperation-time-interval $t_{rec}$ 870.

The controller can process the measured-signalling in order to provide an indication of whether or not a foreign object has been detected. In some examples, the controller can process the measured-signalling that was received after expiry of the recuperation-time-interval, and not measured-signalling that was received during the recuperation-time-interval, in order to provide an indication of whether or not a foreign object has been detected.

As will be discussed below, the measured-signalling can be a coil-current-signal that is representative of the current through the closed-LC-circuit and/or a capacitor-voltage-signal that is representative of the voltage across the resonant-capacitor of the power-transmitting LC circuit.

It will be appreciated by those skilled in the art that the controller can process the measured-signalling in a number of different ways in order to provide the indication of whether or not a foreign object has been detected. One example is described below, in which the resistance of the closed-coil-circuit is determined (using a known value for the resonant-capacitor Ct), and then compared with a resistance-threshold value $R_{thr}$. In other examples, the controller can determine the Q factor of the closed-coil-circuit, and then compare it with a Q-factor-threshold value $Q_{thr}$. In a further example, the capacitor-voltage-signal can be used by the controller (along with a known value for the inductance of the power-transmitting-coil Lt). In a yet further example, both the coil-current-signal and the capacitor-voltage-signal can be used (in which case a known value for the inductance of the power-transmitting-coil Lt and the resonant-capacitor Ct may not be required), although additional hardware may be necessary to measure both quantities.

Returning to FIG. 1, at least in the foreign-object-detection-mode of operation, in this example the controller 114 receives a coil-current-signal that is representative of the current through the short-circuited power-transmitting LC circuit 123.

In this example, the controller 114 includes an ADC (analogue-to-digital converter) 124 that provides the coil-current-signal as a sequence of digital samples that are representative of the current through the closed LC circuit 123. The ADC 124 can provide a plurality of digital samples for each period of the alternating current through the closed LC circuit 123. Advantageously, the ADC 124 can provide digital samples with constant time period $T_s$ (equi-temporal), which need not be aligned with the period of the alternating current through the closed LC circuit 123. The sampling period $T_s$ can be determined by the microcontroller (MCU) of the power-transmitter-unit 102. These samples can be considered as asynchronous to the coil current because the free-running LC circuit 123 can oscillate at its natural frequency that is defined given by Ct and Lt. In this way no additional hardware is required to ensure that samples are taken at specific phases of the alternating current through the closed LC circuit 123, for example to ensure that the alternating current through the closed LC circuit 123 is sampled at it's peaks to obtain the maximum values of the signal.

The controller 114 can then process the coil-current-signal 124 in order to determine the resistance of the closed LC circuit 123. Then, the controller 114 can provide an indication that a foreign object 110 has been detected if the determined resistance of the closed LC circuit 123 is greater than a resistance-threshold value. As will be discussed below, performing foreign object detection based on a determined resistance value can advantageously provide an accurate detection; for instance, a more accurate detection than can be achieved by processing a quality factor (Q) for the closed LC circuit 123.

The controller 114 can periodically switch between the power-transmission-mode of operation and the foreign-object-detection-mode of operation. In some examples, the foreign-object-detection-mode of operation can have a duration that is less than 100 microseconds, or less than 50 microseconds. Also, the controller 114 can activate the foreign-object-detection-mode of operation (and deactivate the power-transmission-mode of operation) only a few times per second, depending upon the application, so that any negative impact on power transfer efficiency is minimal or non-existent. For instance, the controller can activate the foreign-object-detection-mode of operation less than or equal to 1, 2, 5, or 10 times per second.

In some examples, the controller 114 can initiate a foreign-object-detection-mode of operation based on one or more operating parameters of the wireless charging system 100; in particular of the power-transmitter-unit 102. For instance, a resonant frequency tracking algorithm can used to determine whether the displacement/distance between the power-transmitting-coil 106 and the power-receiving-coil 108 has changed. In response, the controller 114 can change the frequency with which the controller initiates a foreign-object-detection-mode of operation 114. Optionally, more frequent foreign object detection can be performed in response to a change in displacement/distance, until the determined displacement/distance settles (for example it's rate of change drops below a threshold value). This can be based on an assumption that it is more likely that a foreign object has come into the vicinity of the power-transmitting-coil 106 if one of the coils has moved.

In further examples, the controller 114 can calculate power losses based on the performance of the power-transmitter-unit 102 and/or the power-receiver-unit 104. The controller 114 can increase the frequency with which the power-transmitter-unit 102 is put into a foreign-object-detection-mode of operation in response to determining a change in the power losses.

The closed LC circuit 123, which includes the power-transmitting-coil 106 and the resonant-capacitor 122, can be modelled as an RLC circuit that includes:

(a) a resistive component that includes:
   (i) the resistance of the components in the closed loop (the power-transmitting-coil 106, the connecting wires/tracks, and the switch(es) in the power-stage 112); and
   (ii) a resistive effect caused by any conductive foreign object 110 that is in the vicinity of the power-transmitting-coil 106, as will be discussed below;
(b) an inductive component that includes the inductance of the power-transmitting-coil 106, which is affected by the proximity of the power-transmitting-coil 106 to the power-receiving-coil 108 as will be discussed below;
(c) a capacitive component that includes the resonant-capacitor Ct 122.

As discussed above, the controller 114 can process the coil-current-signal 124 to determine the resistance of the closed LC circuit 123. Then, the controller 114 can provide an indication that a foreign object 110 has been detected if the determined resistance of the closed LC circuit 123 is greater than a resistance-threshold value. An example of how this processing can be performed will now be described.

To achieve a short measurement window (for instance 50 us, or below 100 us to enable a reasonably low value for the capacitance of the DC-bus capacitor in the power-receiver-unit), while achieving high resolution in the detection of the foreign object, the closed-LC-circuit can be modelled as an undriven RLC circuit using a discrete second order auto-regressive (AR) model:

$$i_{coil}(k) = -a_1 i_{coil}(k-1) - a_2 i_{coil}(k-2), \quad \text{Eq 1}$$

where:
   $i_{coil}$ is a coil current sample at a discrete time k, and
   $a_1$ and $a_2$ are AR system parameters, which are functions of sampling period, RLC resistance, inductance and known capacitance.

The $R_{est}$ and $L_{est}$ parameters can be obtained from parameter $\alpha_1$ and $\alpha_2$ in more than one way. For example, a general serial RLC circuit can be described using the continuous Laplace transfer function $$F_{RLC}(p) = \frac{I_{coil}(p)}{U_{LC}(p)} = \frac{\frac{1}{L_t} p}{p^2 + \frac{R}{L_t} p + \frac{1}{L_t C_t}}, \quad \text{Eq 2}$$

Where p is Laplace operator, $I_{coil}(p)$ is image of coil current $i_{coil}(t)$, and $U_{LC}(p)$ is image of LC circuit input voltage $u_{LC}(t)$. To obtain discrete representation, the Tustin discretization method can be used with formula $$p = \frac{2}{T_s} = \frac{z-1}{z+1}, \quad \text{Eq 3}$$

where, $T_s$ sampling period and z is discrete Z-transformation operator. This leads to discrete transfer function $$F_{RLC}(z) = \frac{I_{coil}(z)}{U_{LC}(z)} = \frac{\frac{2}{L_t T_s} - \frac{2}{L_t T_s} z^{-2}}{\left(\frac{4}{T_s^2} + \frac{2R}{L_t T_s} + \frac{1}{L_t C_t}\right) + \left(\frac{2}{L_t C_t} - \frac{8}{T_s^2}\right) z^{-1} + \left(\frac{4}{T_s^2} - \frac{2R}{L_t T_s} + \frac{1}{L_t C_t}\right) z^{-2}}. \quad \text{Eq 4}$$

Thanks to the fact that the RLC circuit in our case is undriven, the $U_{LC}(z)=0$. This leads to discrete equation $$\left(\frac{4}{T_s^2} + \frac{2R}{L_t T_s} + \frac{1}{L_t C_t}\right) i_{coil}(k) = -\left(\frac{2}{L_t C_t} - \frac{8}{T_s^2}\right) i_{coil}(k-1) - \left(\frac{4}{T_s^2} - \frac{2R}{L_t T_s} + \frac{1}{L_t C_t}\right) i_{coil}(k-2). \quad \text{Eq 5}$$

When comparing the discrete equation Eq 5 and the AR model Eq 1 we can obtain a relationship between parameters of RLC circuit and $\alpha_1$, $\alpha_2$ parameters as follows $$R_{est} = -\frac{T_s}{C_t} \frac{a_2 - 1}{a_2 + a_1 + 1} \quad \text{Eq 6}$$

$$L_{est} = \frac{T_s^2}{4 C_t} \frac{a_2 - a_1 + 1}{a_2 + a_1 + 1} \quad \text{Eq 7}$$

The offline least square method (LSM) can be then used for optimal estimation of parameters $a_1$ and $a_2$ from N collected coil current samples using formula $$\begin{bmatrix} a_1 \\ a_2 \end{bmatrix} = [\Phi^T \Phi]^{-1} \Phi^T Y, \quad \text{Eq 8}$$

where $$\Phi = \begin{bmatrix} i_{coil}(k+1) & i_{coil}(k) \\ \vdots & \vdots \\ i_{coil}(k-1+N) & i_{coil}(k-2+N) \end{bmatrix}, \quad \text{Eq 9}$$

is measurement matrix and $$Y = \begin{bmatrix} i_{coil}(k+2) \\ \vdots \\ i_{coil}(k+N) \end{bmatrix}, \quad \text{Eq 10}$$

is the AR system output vector.

This method is used to estimate the resistance $R_{est}$ and inductance $L_{est}$ of a free-running (undriven) second order RLC circuit according to equations Eq 6 and Eq 7, where capacitance Ct and sampling period Ts are known. Due to the relatively low complexity of the problem (covariance matrix is of only second order and several dozens of samples are needed) low computational burden is achieved.

It will be appreciated that different types of algorithm that utilize equitemporal sampling can be used to determine the resistance of the closed-LC-circuit.

Advantageously, this processing method does not require any sampling synchronisation with the current though the power-transmitting-coil. Therefore, no extra hardware to achieve synchronisation may be required. The ADC 124 should apply a constant sampling rate that satisfies the Nyquist sampling rate for the power-transmitter-unit 102, in order to prevent aliasing effect and thus allow coil current signal reconstruction. In this way, enough samples are available to satisfactorily reconstruct the measured signal. According to Nyquist law $T_s \ll T_0/2$, where $T_0=2\pi\sqrt{L_t C_t}$ is the resonant frequency of the LC circuit 123. In some applications, the ADC 124 is configured to acquire at least 8 samples per $T_0$ period.

As discussed above, the closed LC circuit 123 is undriven (free-running with zero voltage at input) when the power-transmitter-unit 102 is in the foreign-object-detection-mode of operation; only one quantity (the current through the closed LC circuit 123) can be measured. The method can also be independent of the coil current amplitude at the start of the foreign-object-detection-mode of operation (time $t_0$ in FIG. 3), provided that significant magnetic saturation is not present.

The controller 114 can have access to a resistance-threshold value $R_{thr}$, which can be stored in memory. The value for the resistance-threshold value $R_{thr}$ can be determined by modelling the closed LC circuit 123 using coil-current-signalling 124 that is received when a foreign object is known not to be present. The controller 114 can then provide an indication that a foreign object has been detected if the determined resistance $R_{est}$ of the closed-LC-circuit is greater than a resistance-threshold value $R_{thr}$.

Figure 5:
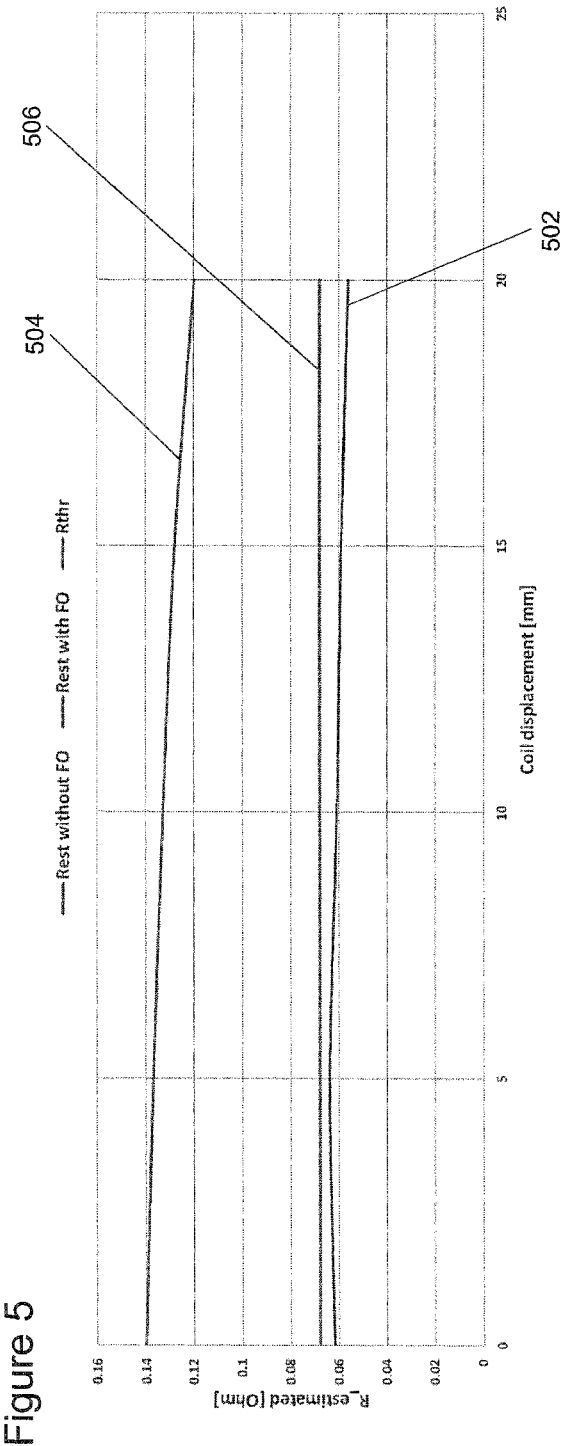
FIG. 5 shows a plot of: (i) $R_{est}$ on the vertical axis, versus (ii) the distance/displacement between the power-transmitting-coil and the power-receiving-coil on the horizontal axis.

FIG. 5 shows a plot of: (i) $R_{est}$ (estimated resistance of the closed LC circuit 123 using the method described above) on the vertical axis, versus (ii) the distance/displacement between the power-transmitting-coil and the power-receiving-coil on the horizontal axis. A first plot 502 shows results for a power-transmitting-coil that does not have a foreign object nearby. A second plot 504 shows results for a power-transmitting-coil that does have a foreign object nearby. FIG. 5 shows actual measured data.

The first plot 502 shows that the estimated resistance $R_{est}$ is almost constant for the entire range of coil displacement values, when there is no foreign object present. The two plots 502, 504 show that when there is a foreign object present, the estimated resistance $R_{est}$ is significantly higher than when there is no foreign object present.

Also shown in FIG. 5 is an example constant value for the resistance-threshold value $R_{thr}$ 506. As will be appreciated from the plots of FIG. 5, a foreign object can be detected by comparing the estimated resistance $R_{est}$ with the resistance-threshold value $R_{thr}$ 506.

The second plot 504 shows a small drop of the estimated resistance $R_{est}$ at higher displacements, when a foreign object is present. This is caused by reduced ferrite hysteresis losses in the power-receiving-coil, and a higher amplitude of the current in the power-transmitting-coil, which affects the ADC measurement precision.

Figure 6:
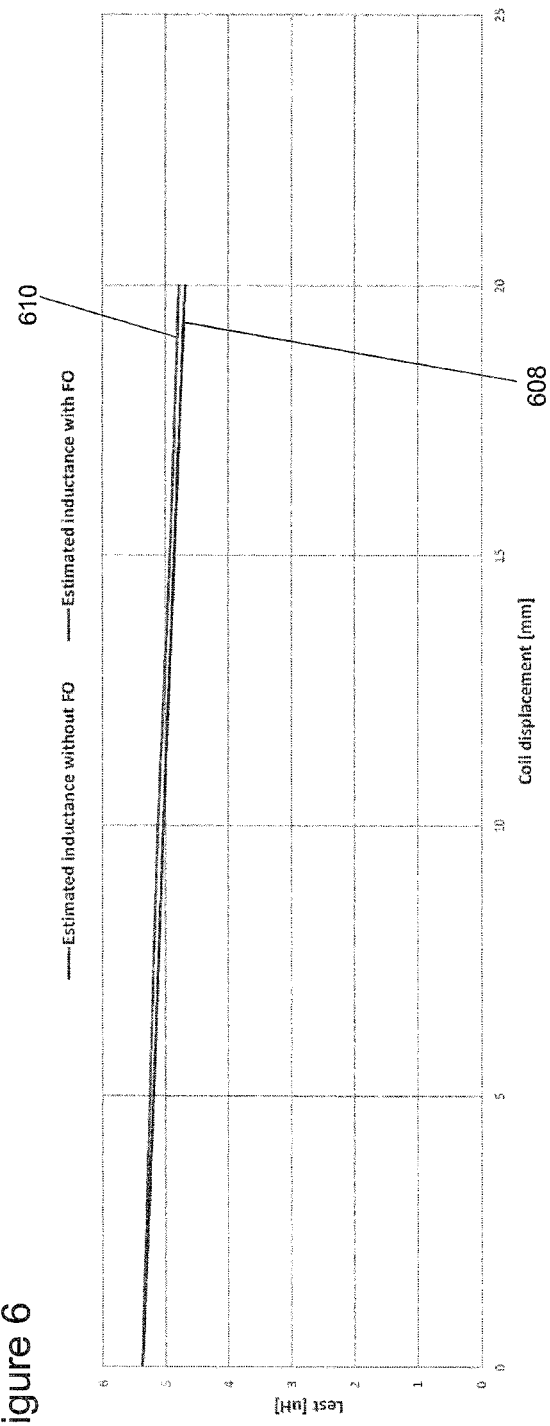
FIG. 6 shows a plot of: (i) $L_{est}$ on the vertical axis, versus (ii) the distance/displacement between the power-transmitting-coil and the power-receiving-coil no the horizontal axis.

FIG. 6 shows a plot of: (i) $L_{est}$ (estimated inductance of the closed LC circuit 123 using the method described above) on the vertical axis, versus (ii) the distance/displacement between the power-transmitting-coil and the power-receiving-coil on the horizontal axis. A first plot 608 shows results for a power-transmitting-coil that does not have a foreign object inserted nearby the power-transmitting coil and the power receiving coil. A second plot 610 shows results for a power-transmitting-coil that does have a foreign object nearby. FIG. 5 shows actual measured data.

FIG. 6 shows a significant change in the estimated inductance $L_{est}$ for different coil displacement values. In FIG. 6, the estimated inductance $L_{est}$ of 85 mm round planar coil reduces from about 5.5.uH to about 4.8 uH, when the coil displacement is increased from 0 to 20 mm.

As discussed above, by using the resistance $R_{est}$ of the closed-loop-circuit rather than quality factor ($Q=\sqrt{L/C}/R$), the controller can more accurately detect a foreign object. For instance, the controller can discriminate between the presence of a foreign object and any changes in the response of the closed-LC-circuit due to the displacement between the power-transmitting-coil and the power-receiving-coil changing. In this way, the variation of estimated inductance for different coil displacement values does not affect the accuracy of the foreign object detection, and the displacement between the coils is less likely to lead to an incorrect determination that a foreign object is, or is not, present.

As shown in FIG. 6, the estimated inductance $L_{est}$ is highest if there is a perfect alignment (zero displacement) between power-transmitting-coil and the power-receiving-coil, and the estimated inductance $L_{est}$ drops as the displacement increases. Since the decay of coil current is a function of $e^{(-R/2L)}$, the decay is relatively fast for inductance values. Since the controller can directly estimate the inductance $L_{est}$ and the resistance $R_{est}$, the controller can evaluate more precisely whether or not a foreign object is present.

For example, the power loss due to the presence of the foreign object can be accurately calculated based on the actual coil current. The controller can determine a value for the estimated resistance of the RLC circuit ($R_{tx}$) without a foreign object present (shown with reference 502 in FIG. 5). $R_{tx}$ can represent the resistance of the coil wire and the resistance of MOSFETs in the power-stage, without RX, and can be performed as part of calibration during manufacturing. The controller can also determine a value for the estimated resistance of the RLC circuit ($R_{est}$) with a foreign object present (shown with reference 504 in FIG. 5). The controller can then subtract $R_{tx}$ (502) from $R_{est}$ (504) to determine the resistance of the foreign object. Thus, accurate power loss due to the foreign object can be determined by multiplying the resistance of the foreign object by the square of the current in transmitter coil: the power loss due to the foreign object is $P_{fo}=(R_{est}-R_{tx})I_{coil}^2$.

Returning to FIG. 1, the following description relates to a power-transmitter-unit 102 that has a plurality of power-transmitting-coils 106a, 106b.

The power-stage 112 can selectively provide power to the plurality of power-transmitting-coil 106a, 106b simultaneously in some examples, or to only a subset of the power-transmitting-coils 106a, 106b, in order to provide a desired power at the power-receiver-unit 104.

For the multi-coil system, the power-transmitter-unit 102 includes a plurality of coil-switches 126; one for each of the power-transmitting-coils 106. Each coil-switch 126 is connected in series with a power-transmitting-coil 106 such that: when a coil-switch 126 is closed, the associated coil is connected to the power-stage 112; and when a coil-switch 126 is open, the associated coil is disconnected from the power-stage 112. In this example a multiplexer (MUX) 128 provides control signals to operate the coil-switches 126. The multiplexer (MUX) 128 is in turn controlled by the controller 114. In this way, the controller 114 can set which one or more of the power-transmitting-coils 106 can be provided with power from the power-stage 112.

When the power-transmitter-unit 102 is in the power-transmission-mode of operation, in a similar way to that described above, the power-stage 112 is configured to provide a potential difference across the respective first-ends and second-end of the plurality of power-transmitting-coils 106 (either sequentially or simultaneously);

In the foreign-object-detection-mode of operation, the controller 114 controls the power-stage 112 such that each of the power-transmitting-coils 106 that is active during the power-transmission-mode of operation is individually used to detect whether or not a foreign object is inserted between the power-transmitting coil and the power receiving coil, or otherwise in the magnetic field between the power-transmitting-coil 106 and the power-receiving-coil 108. For example, coil-current-signalling may be received for each of the individual power-transmitting-coils 106 in turn during a single foreign-object-detection-mode of operation. Alternatively, the controller 114 may put the power-transmitter-unit 102 back into the power-transmission-mode of operation after receiving coil-current-signalling for one of the power-transmitting-coils 106, and then control the power-stage 112 such that coil-current-signalling is received for a different power-transmitting-coil 106 for the next foreign-object-detection-mode of operation.

Either way, the power-stage 112 is configured to not provide a potential difference across the respective first-ends and second-end of all of the plurality of power-transmitting-coils 106 in the foreign-object-detection-mode of operation. Then, for each of the plurality of power-transmitting-coils in turn: the controller initiates a recuperation-time-interval, during which the power-stage provides a potential-difference across the first-end and the second-end of the LC circuit that has the opposite polarity to the current through the power-transmitting-coil. After expiry of the recuperation-time-interval, the controller connects the first-end of the power-transmitting LC circuit to the second-end of the LC circuit such that the power-transmitting LC circuit is short-circuited and defines a closed-LC-circuit. The controller then receives a coil-current-signal that is representative of the current through the closed-LC-circuit.

The controller 114 can then process the coil-current-signals in order to determine the resistance of the closed-LC-circuit 123. If the determined resistance of any of the closed-LC-circuits 123 is greater than an associated resistance-threshold value $R_{thr}$, then the controller 114 can provide an indication that a foreign object has been detected. The resistance-threshold value $R_{thr}$ may or may not be the same for each of the plurality of power-transmitting-coils 106.

In this way, the coil-switches 126 of all except one of the power-transmitting-coils 106 can be opened during the foreign-object-detection-mode of operation, such that the other power-transmitting-coils 106 are disconnected from the power-stage 112. Active power-transmitting-coils 106 can be selected in turn so that all power-transmitting-coils 106 that are used during power transfer can be scanned periodically. The multi-coil implementation can also enhance the resolution of the foreign object detection; this is because better coupling can be achieved between foreign objects and smaller power-transmitting-coils.

Figure 7:
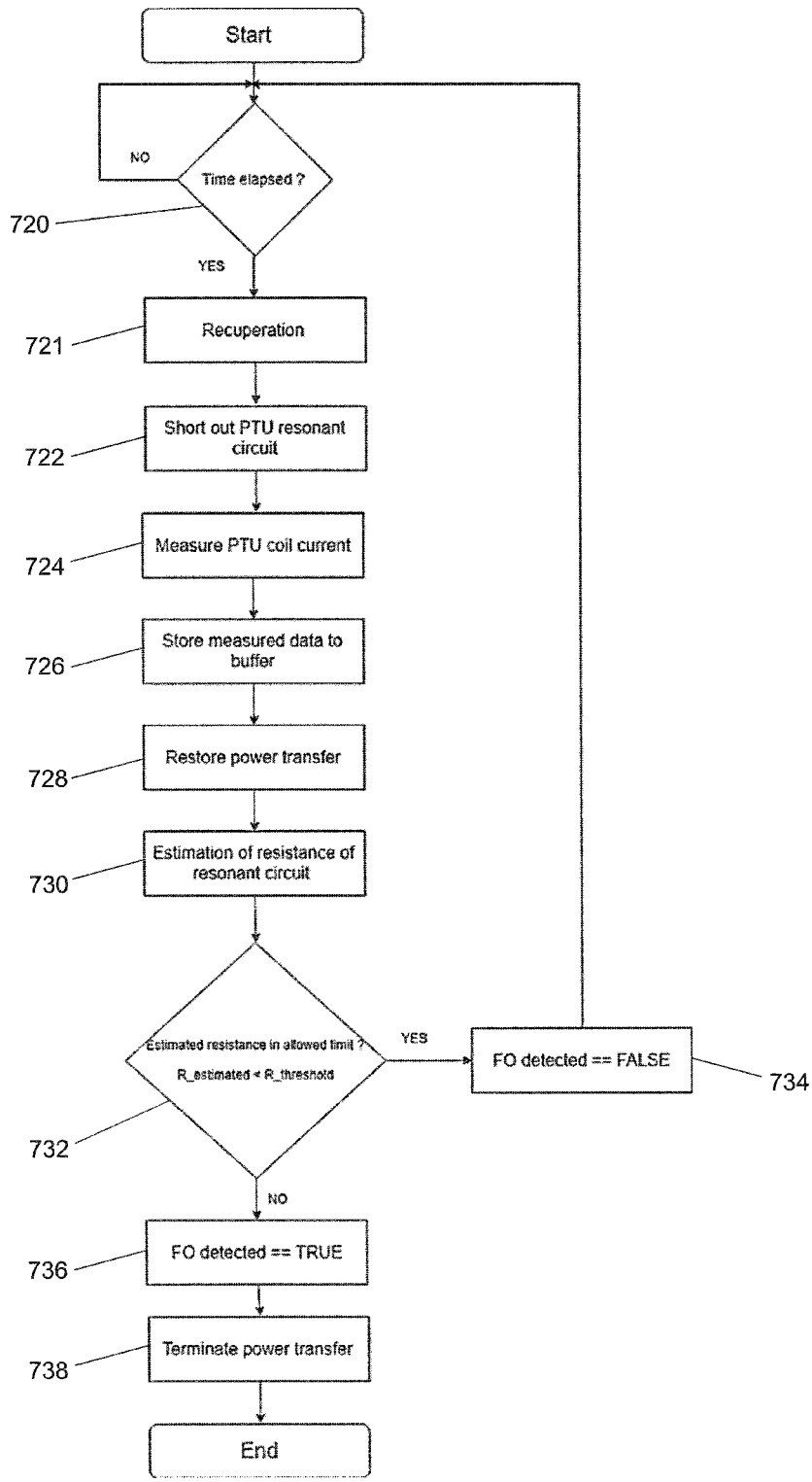
FIG. 7 shows a process flow that illustrates processing that can be performed to determine whether or not a foreign object is in the vicinity of a power-transmitting-coil.

In some example, the plurality of power-transmitting-coils 106a, 106b that are discussed above may be a subset of power-transmitting-coils in a power-transmitting-coil-array. FIG. 7 shows a process flow that illustrates processing that can be performed by a controller to determine whether or not a foreign object is in the vicinity of a power-transmitting-coil. At the start of the process flow, the power-transmitter-unit is in the power-transmission-mode of operation.

At step 720, the process checks whether or not a predetermined time period has elapsed. In this example, the process periodically puts the power-transmitter-unit into a foreign-object-detection-mode of operation. If the predetermined time period has not elapsed, then the power-transmitter-unit continues to operate in the power-transmission-mode of operation. If the predetermined time period has elapsed, then the process moves to step 721 to enter the foreign-object-detection-mode of operation.

At step 721, the controller initiates a recuperation-time-interval $t_{rec}$, during which the potential difference across the of power-transmitting-coil is set to a value that suppresses the resonance of the current through the power-transmitting-coil, as discussed above.

At step 722 the process short-circuits the power-transmitting LC circuit 123, for example by connecting both ends of the power-transmitting-coil to a common potential (such as a supply-voltage or ground).

At steps 724 and 726, a coil-current-signal, which is representative of the current through the power-transmitting-coil, is received and is stored into memory. This memory may be referred to as a buffer.

In this example, the processing of the received coil-current-signal does not have to be performed while the power-transmitting LC circuit 123 is short-circuited. Therefore, at step 728, the process restores power transfer by putting the power-transmitter-unit back into the power-transmission-mode of operation.

At step 730 the process estimates the resistance of the closed-LC-circuit, for example using the algorithms discussed above.

At step 732, the process compares the estimated resistance ($R_{est}$) with the resistance-threshold value ($R_{thr}$). If the estimated resistance ($R_{est}$) is less than the resistance-threshold value ($R_{thr}$), then the process goes to step 734, a determination is made that a foreign object has not been detected, and the process returns to the start. If the estimated resistance ($R_{est}$) is greater than the resistance-threshold value ($R_{thr}$), then the process goes to step 736, and a determination is made that a foreign object has been detected.

In this example, if a foreign object has been detected, then the process moves to step 738 and terminates power transfer by the power-transmitter-unit. It will be appreciated that this functionality can be achieved in a number of ways. For example, the process can disable the power-transmission-mode of operation, optionally until the power-transmitter-unit has been reset or until the process performs a subsequent foreign-object-detection-mode of operation that indicates that the foreign object is no longer present.

It will also be appreciated that the processing of steps 730, 732, 734, 736 and 738 can be performed when the power-transmitter-unit is in the power-transmission-mode of operation (as in this example), or when the power-transmitter-unit is in the foreign-object-detection-mode of operation.

Advantageously, all of the processing illustrated by FIG. 7 can be executed at the power-transmitter-unit. Therefore, the power-receiver-unit does not need any additional hardware, algorithms or communication links with the power-transmitter-unit.

In at least some instances, the instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A power-transmitter-unit comprising:
a power-transmitting-coil for wirelessly providing power to a power-receiver-unit, and a resonant-capacitor connected to the power-transmitting-coil, such that together they define an LC circuit, wherein the LC circuit comprises a first-end and a second-end;
a power-stage for selectively providing power to the LC circuit;
a controller configured to define a power-transmission-mode of operation and a foreign-object-detection-mode of operation, wherein:
in the power-transmission-mode of operation:
the power-stage is configured to provide a potential-difference across the first-end and the second-end of the LC circuit;
in the foreign-object-detection-mode of operation:
for a recuperation-time-interval, the power-stage is configured to provide a potential-difference across the first-end and the second-end of the LC circuit that has the opposite polarity to the current through the power-transmitting-coil;
after expiry of the recuperation-time-interval, the first-end of the LC circuit is connected to the second-end of the LC circuit such that the LC circuit is short-circuited and defines a closed-LC-circuit; and
the controller is configured to receive measured-signalling that is representative of an operating parameter of the power-transmitter-unit;
wherein the controller is further configured to:
process the measured-signalling in order to provide an indication of whether or not a foreign object has been detected.

2. The power-transmitter-unit of claim 1, wherein, in the power-transmission-mode of operation:
the power-stage is configured to alternately provide a first-potential-difference and a second-potential-difference across the first-end and the second-end of the LC circuit in order to generate current through the power-transmitting-coil.

3. The power-transmitter-unit of claim 2, wherein, in the foreign-object-detection-mode of operation:
for the recuperation-time-interval, the power-stage is configured to provide the opposite one of the first-potential-difference and the second-potential-difference across the first-end and the second-end of the power-transmitting-coil to the potential-difference that would cause resonance of the current through the power-transmitting-coil.

4. The power-transmitter-unit of claim 1, wherein the controller is configured to set the recuperation-time-interval based on operational-signalling that is representative of an operating parameter of the power-transmitter-unit obtained during a preceding power-transmission-mode of operation.

5. The power-transmitter-unit of claim 1, wherein the measured-signalling is representative of an operating parameter of the power-transmitter-unit after expiry of the recuperation-time-interval.

6. The power-transmitter-unit of claim 1, wherein the measured-signalling is representative of an operating parameter of the closed-LC-circuit.

7. The power-transmitter-unit of claim 1, wherein:
the measured-signalling comprises a coil-current-signal that is representative of the current through the closed-LC-circuit; and
the controller is configured to:
process the coil-current-signal that was received during the foreign-object-detection-mode of operation, in order to determine the resistance of the closed-LC-circuit; and
provide an indication that a foreign object has been detected if the determined resistance of the closed-LC-circuit is greater than a resistance-threshold value.

8. The power-transmitter-unit of claim 1, further comprising an ADC configured to provide the measured-signalling as a sequence of digital samples that are representative of an operating parameter of the closed-LC-circuit.

9. The power-transmitter-unit of claim 1, wherein the controller is configured to apply an auto-regressive modelling algorithm to the measured-signalling in order to provide an indication of whether or not a foreign object has been detected.

10. The power-transmitter-unit of claim 1, wherein the controller is configured to apply a least squares method to the measured-signalling in order to provide an indication of whether or not a foreign object has been detected.

11. The power-transmitter-unit of claim 1, wherein the controller is configured to disable the power-transmission-mode of operation if the controller provides an indication that a foreign object has been detected.

12. The power-transmitter-unit of claim 1, wherein:
the power-transmitter-unit comprises a plurality of power-transmitting-coils for wirelessly providing power to a power-receiver-unit, wherein each power-transmitting-coil is connected to a resonant-capacitor to define an LC circuit, and wherein each LC circuit comprises a first-end and a second-end; and
in the power-transmission-mode of operation:
the power-stage is configured to provide a potential difference across the respective first-ends and second-end of the plurality of LC circuits;
in the foreign-object-detection-mode of operation, for each of the plurality of LC circuits in turn:
for a recuperation-time-interval, the power-stage is configured to provide a potential-difference across the first-end and the second-end of the LC circuit that has the opposite polarity to the current through the power-transmitting-coil;
after expiry of the recuperation-time-interval, the first-end of the LC circuit is connected to the second-end of the LC circuit such that the LC circuit is short-circuited and defines a closed-LC-circuit; and
the controller is configured to receive measured-signalling that is representative of an operating parameter of the power-transmitter-unit;
wherein the controller is further configured to:
process the measured-signalling in order to provide an indication of whether or not a foreign object has been detected.

13. An electronic device comprising the power-transmitter-unit of claim 1.

14. A method of detecting a foreign object, the method comprising:
in a power-transmission-mode of operation:
providing a potential-difference across a first-end and a second-end of an LC circuit, wherein the LC circuit comprises a resonant-capacitor connected to a power-transmitting-coil;
in a foreign-object-detection-mode of operation:
for a recuperation-time-interval, providing a potential-difference across the first-end and the second-end of the LC circuit that has the opposite polarity to the current through the power-transmitting-coil;
after expiry of the recuperation-time-interval, connecting the first-end of the LC circuit to the second-end of the LC circuit such that the LC circuit is short-circuited and defines a closed-LC-circuit; and
receiving measured-signalling that is representative of an operating parameter of the power-transmitter-unit;
processing the measured-signalling in order to provide an indication of whether or not a foreign object has been detected.

* * * * *